Aug. 27, 1974     S. R. BARNETTE     3,832,264
SELF-REINFORCED PLASTIC ARTICLES WITH CORE ENVELOPMENT
Original Filed Jan. 14, 1963     2 Sheets-Sheet 1
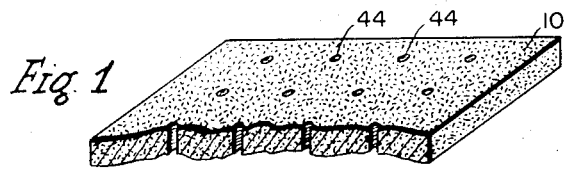
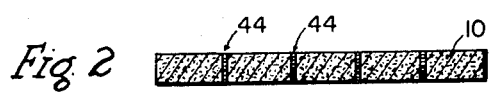
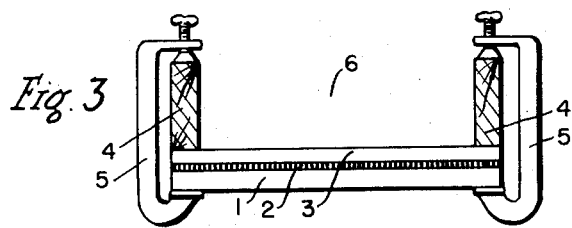
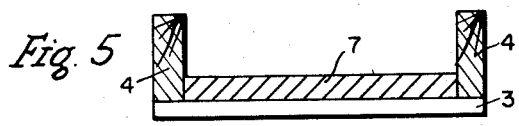
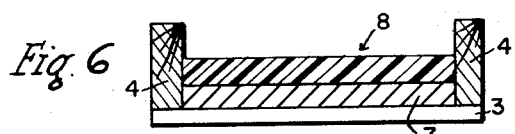
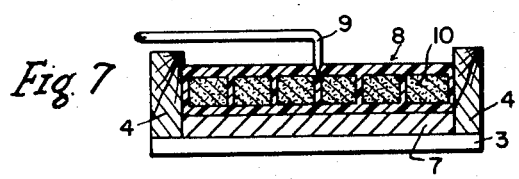
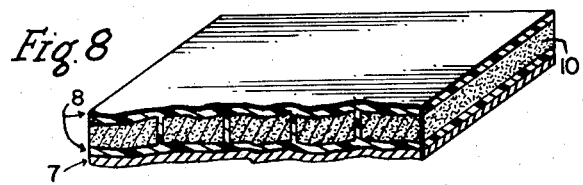
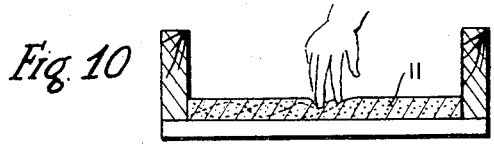
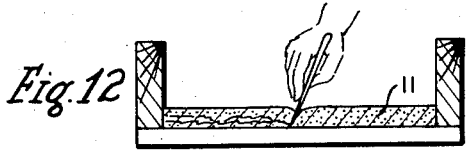
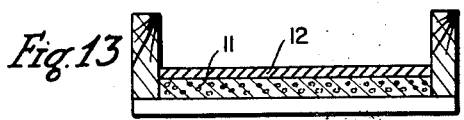
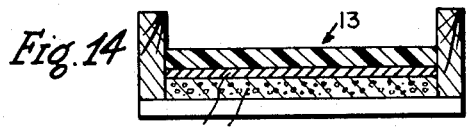
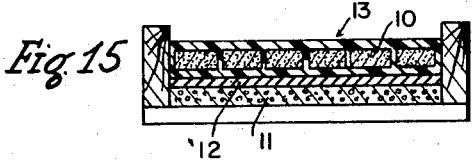
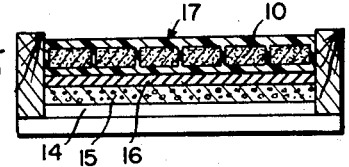
INVENTOR.
BY

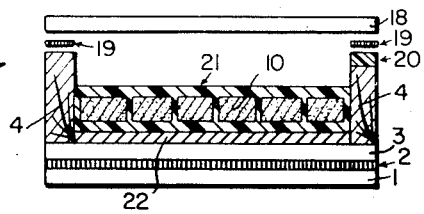
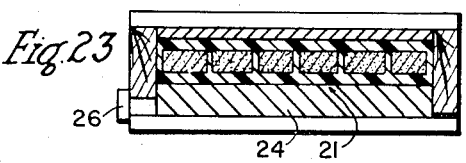
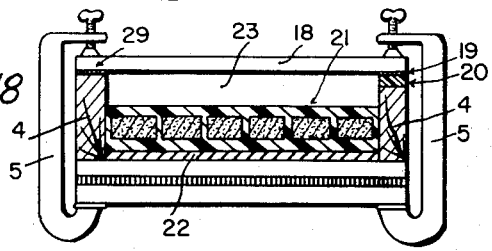
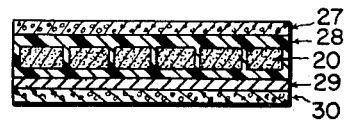
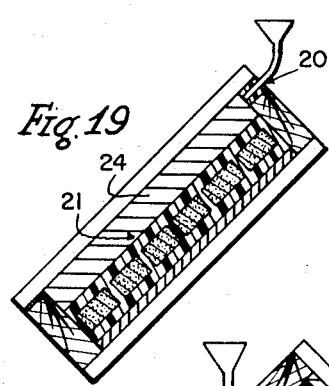
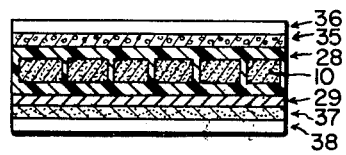
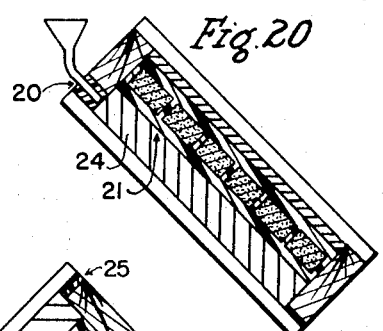
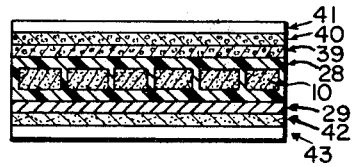
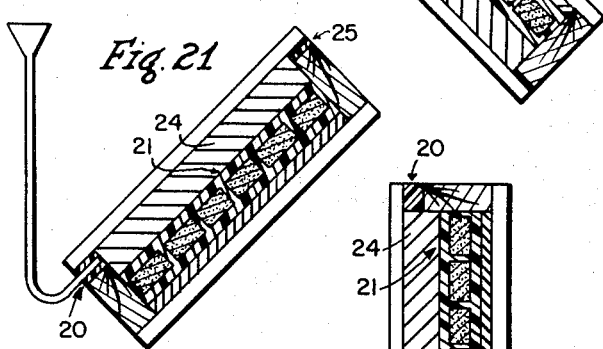
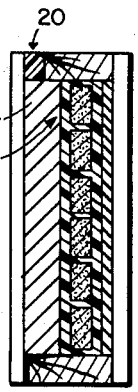

United States Patent Office 3,832,264
Patented Aug. 27, 1974

3,832,264
SELF-REINFORCED PLASTIC ARTICLES WITH
CORE ENVELOPMENT
Stanley Ronald Barnette, 90 Cherokee St.,
Miami Springs, Fla. 33166
Continuation of abandoned application Ser. No. 648,728,
June 26, 1967, which is a division of Ser. No. 254,851,
Jan. 14, 1963, now Patent No. 3,328,500, which in turn
is a continuation-in-part of Ser. No. 808,599, Apr. 24,
1959, now Patent No. 3,072,973. This application Feb.
5, 1971, Ser. No. 113,099
Int. Cl. B32b 3/10
U.S. Cl. 161—41       14 Claims

ABSTRACT OF THE DISCLOSURE

An ornamental panel comprising at least a first and second layer of resinous material adhered together, a plurality of relatively rigid blocks of core media material encased between said layers, at least one of said layers having particles intermixed therein, and wherein chips substantially larger than said particles embedded in the exterior surface.

---

This application is a continuation of Ser. No. 648,728, filed June 26, 1967, now abandoned, which in turn is a divisional of my co-pending application, Serial No. 254,-851, filed Jan. 14, 1963, now Pat. No. 3,328,500, which was a continuation-in-part of my co-pending application, Ser. No. 808,599, filed Apr. 24, 1959, now Pat. No. 3,072,973.

This invention relates to a process for producing plastic articles namely, structural panels, table tops, flooring, skylights, roofing, furniture, sandwich walls, window sills, etc., comprising a slab core stock means positioned between two plastic bodies, said plastic bodies and core mutually self-reinforced and self-bonded.

Another object of this invention is to provide slab cores readily machined so as to be surrounded and interlocked into the plastic bodies of the article that covers said core.

It is another object of this invention to produce articles having plastic bodies self-formed, self-bonded and interlocked to the core, with any desired exterior surface finish and having a decorative effect visible through the plastic, said core providing rigidity, lightweightedness, acoustical properties, shock-proof properties, insulation properties, etc.

The invention relates to a method of forming articles of laminated plastic by a casting process which includes having the articles in any desired shape or form and with plain or decorative surfaces and/or plain or decorative embedments.

The invention contemplates the method of enveloping a core stock whereby to attain a product having bulk without excess weight and with full strength characteristics.

The invention also relates to an article of manufacture in the form of a cast plastic laminate. [Reference application 808,599 (Pat. No. 3,072,973), page 1, lines 3–12.]

An object of the invention is to provide a means of forming cast laminated sheeting and surfacing material wherein the laminations are cast in layers, with or without a decorative material, and, also, completely surrounding a core stock by means of an enveloping by plastic material that hardens with cure processes.

The invention also relates to a method of cast laminating pearlized, plain, or patterned decorative sheeting and enveloping a core stock material so as to achieve a structural surfacing material and particularly to such methods utilizing plastic.

Another object of the invention is to provide a method wherein the cast laminated material is provided with an extremely smooth or embossed effect, relatively hard surface.

A further object of the invention is to provide a method wherein the core material is completely surrounded by plastic and adds materially to the strength of the finished itemed product.

Finally this invention relates to articles of manufacture in the form of a slab comprising a plastic body interlocking a core and being self-reinforced.

In accordance with these and other objects which will become apparent hereinafter, the instant invention will now be described with reference to the accompanying drawings illustrating a preferred embodiment thereof:

In the drawings:

FIG. 1 is a portion of slab core stock to be used in connection with this invention and FIG. 2 depicts a cross-sectional view of said core.

FIGS. 3 and 4 are cross-sectional views of molds that may be employed in the practice of this invention.

FIGS. 5 through 7 are cross-sectional views of the basic steps to envelope a core.

FIG. 8 is a portion of a plastic article produced in accordance with this invention and FIG. 9 illustrates the same article in a cross-sectional view.

FIGS. 10 through 16 are cross-sectional views illustrating the steps of decorating the liquid resin and enveloping the core to form an article with one finished surface.

FIG. 17 through 23 are cross-sectional views of the steps involved in order to produce an article with two finished surfaces.

FIGS. 24 through 27 are cross-sectional views of some examples of articles produced using the processes described in this invention.

With reference to the drawings, the instant invention will now be described with reference to an example.

FIG. 1 depicts a portion of a slab core stock means 10 having holes 44 drilled from one surface side of said core through and out the other surface. The diameter, position and number of holes depending on the amount of reinforcement desired. In FIG. 2 a cross-sectional view of said core 10 illustrates the holes 44 arranged in a given order.

FIG. 3 depicts a mold assembly comprising a leveled platform 1, a metal foil blanket 2, a mold base 3 and mold walls 4. The mold walls and the mold base are tightly secured by means of clamps 5 to form the open mold 6. The open mold 6 in some instances may be replaced by a one section cavity mold illustrated in FIG. 4, whenever standard sizes are manufactured.

The simple mold forms illustrated in 4 of FIG. 3 are of the Melamine (Formica covered plywood) type as they can be very readily shaped to provide the desired side walls contours of the mold.

The mold base 3 as indicated in FIG. 3 is a glass or Melamine type having a surface conforming to the desired surface finish of the article, and a releasing compound for the mold base and the mold walls must be used. In the event that a polyester film is used to form the mold base and/or the mold walls, no coating is necessary as this material in itself acts as a ready release.

The one section cavity mold illustrated in FIG. 4 includes rubber, metal, glass or plastic material and in the case of rigid materials, the mold walls will form with the mold base an angle over 90° to permit the removal of the article from the mold.

Any thermosetting or thermoplastic resinous material or matter which hardens with cure, such as Epoxy, Polyester, Styrene, Methyl-Methacrylate or any others, can be used in formulating the cast laminated sheeting and enveloping processes. However, for descriptive purposes in respect to the methods used, the Polyester thermosetting variety formulation is used in this description. If thermoplastics are used, the described method will vary in that instead of the air cure, direct heat will be employed. [*Reference* application 808,599 (Pat. No. 3,072,-973), page 3, lines 14–22.]

Referring to FIG. 5 an example of an article produced by this method will be illustrated step by step through the succeeding illustrations, consisting in a 48" diameter table top.

For the example of the 48" diameter table top a mixture is prepared consisting of 4 quarts of polyester resin, ⅓ quart of Styrene, 1 drum of Cobalt Naphthenate (6% Cobalt) and 3 ounces of Black Polyester Paste.

One third of the mixture is placed in a separate container and mixed with 1% of Methyl Ethyl Ketone Peroxide (60%), stirred and poured into the open mold on top of the mold base which surface conforms to the desired exterior surface finish of the article, to a partial depth of the mold, leveled to the edges and permitted to harden to a certain degree, as indicated by 7 of FIG. 5. The remaining two thirds of the mixture are mixed with 1% of Methyl Ethyl Ketone Peroxide (60%) stirred and poured on top of the first cured plastic 7 as illustrated in 8 of FIG. 6. Then the core ¾" thick, whether wood, plywood, particle board, honeycomb, foamed plastic or any other filler, and slightly narrower than the mold rim is positioned on top of this liquid resin 8, by means of the removable device 9 so that the core 10 remains aligned in a parallel plane referred to the first plastic cured surface, permitting the resin to rise through and permeate the edges and holes and flow and cover the top surface of the core, permitting said resin to self-bond to the first plastic layer and to the core until set, as depicted in FIG. 7.

The article when removed from the mold will have a plastic body interlocking a core by both sides and by plastic nerves through said core, said plastic body consisting of two self-bonded plastic layers. This method of interlocking the core provides a mutually self-reinforced plastic-body-to-core article, because in some instances the core will add strength to the plastic and in other instances the plastic will provide the strength. This is particularly important when using foam cores because the plastic will act as a rigid member to maintain the stability of the article.

Another example will be given which more clearly indicates the dimensional effects that may be achieved in this cast lamination process. It should be noted that this formulation is used as an example dependent upon the effect of dimension desired and, also, the thickness of the embedments themselves and the amount of liquids necessary to completely cover. However, still using a 48" round mould, the required materials would include a total of 384 ozs. thermosetting resin, 7 ozs. purified Styrene, 3⅔ ozs. Mek-Peroxide, ½ oz. Cobalt, 2½ ozs. Pearlessence, and 1 oz. pigmented white Polyester paste, and 10 drops of blue pigmented Polyester color and paste tint. Of the above, 5½ qts. of the resin (176 ozs.) is mixed with ¼ oz. of the Cobalt and 10 drops of the tinted blue paste. This amount is placed in readiness so as not to lose control inbetween the cast laminations that the various layers must be placed at the proper "jell" time to assure adherence of the layers. Of the total quantity stated, 2 quarts (64 ozs.) of the plastic is mixed with 7 ozs. Styrene and 1 oz. of Mek-Peroxide which is poured into the mould and leveled to the edges by hand operation. In approximately 15 minutes, the mass will begin to "jell," at which time 2 quarts (64 ozs.) from the stated total of resin is mixed with ½ oz. Mek-Peroxide and testing to see that the mass is still jelled yet not hard, this mix is poured into the mould and leveled to the edges. At this time various decorative media, such as dried leaves, mother of pearl flakes, metallic thread and the like, are placed in a formed pattern therein. These patterns can almost be exact in that there will be no movement of the placed items. Placing the items requires approximately 10 minutes for a 48" size layout, at the end of which time a quart of the total amount of the clear resin is added mixed with a ⅓ oz. of the Mek-Peroxide. There is remaining 16 ozs. of the clear resin from the original total amount to which ½ oz. of Pearlessence is added, awaiting the last layer to "jell."

In about 20 minutes the base coat should be sufficiently jelled to permit the addition of the said 16 ozs. of clear resin mixed with Pearlessence and to which ½ oz. of Mek-Peroxide is added, kept agitated so as not to settle, stirred and brushed on the clear base in the mould. While this brush coat is setting, 6½ quarts (208 oz.) of the total resin is mixed with 2 ozs. of Pearlessence and ¼ oz. Cobalt in readiness. At this state, and approximately 5 minutes after completing the pouring of the last addition, 2 quarts of the resin (64 ozs.) is mixed with 1 oz. of pigmented white and ⅓ oz. of Mek-Peroxide. It is stirred well and upon testing tackiness of the "jell," pour this amount into the mould and level to the edges of the mould. In approximately 10 minutes, the white pigmented resin should have jelled to the proper consistency, still in the tacky stage, so that the core filler will be added. At any time within an hour, the remaining 4½ quarts mixed with 1 oz. of the Mek-Peroxide is poured on the core and smoothed to the edges of the mould and into the cavity. This last 4½ quarts resin can either be tinted, pearlized or embedments added directly to the resin so that when solidified it will have a designed wall and back surface. In approximately 3 hours time, the plastic is set so as to be able to be removed from the mould. As is the case of the previous description, this casting will have only one extremely smooth surface. [*Reference* application 808,599 (Pat. No. 3,072,973) line 20 to end page 7, and page 8 to line 27 through the word surface.]

It should be understood that following the method and principles of the invention above disclosed that table tops, decorative panels, wall panels, as well as structural surfacing material of various kinds, may be formed. [*Reference* application 808,599 (Pat. No. 3,072,973) page 9, lines 25–28.]

It will be noted from the foregoing description that I have provided as an article of manufacture, a cast plastic sheet suitable for many uses, such as, for example, but not limited to table tops, and that said sheet has considerable bulk or as much bulk as may be desired, without any greater weight than that of the plastic, the bulk being provided to the extent desired by an insert or core which is so embedded and in effect welded to the plastic material which surrounds it as to be integral. The cores can be of a wide variety and as light or as heavy as desired. The method or process of production is such that the sheet produced, whether with or without a core or filler, can be wholly or partially transparent and of any desired variety or mixtures of colors. By suitable embedments either per se or in addition to the core or filler, any number of beautiful designs and decorative motifs can be had. [*Reference* application 808,599 (Pat. No. 3,072,973) page 10, lines 1–16.]

It is important to observe that in casting a laminated sheet comprising a lamination of, for example, wood or composition board and plastic, the insert must be covered on both sides by equal thicknesses of the outer plastic laminations to avoid warpage of the completed product.

FIG. 8 is a side view of a portion of said self-reinforced article illustrating the plastic nerves through the core 10 and FIG. 9 is a cross-sectional view of said article illustrating the plastic nerves extending from both sides of the plastic 8 that covers the core 10 and the first plastic layer 7 self-bonded to the layer 8.

This article has a finished surface that corresponds to the mold plate and a secondary even plastic surface that corresponds to the last cured plastic, both black.

Whenever a deep three-dimensional decorative effect is desired to be visible through the plastic surface, this may be accomplished by means of the following variations:

(a) Decorative effect formed in the first liquid resin quantity poured into the mold.

(b) Decorative effect formed in the second liquid resin quantity poured on top of the first cured layer which also covers the top surface of the core.

The decorative effect can be formed in the first liquid resin poured in the mold by means of any of the following techniques:

The first example illustrated in FIG. 10 consists in adding to a predetermined amount of liquid catalyzed resin one amount of pearlessence pigment, stirring, and pouring into the mold to form a liquid layer 11, by hand means agitating this liquid mixture in a combing motion to disperse and orient the pearlessence pigment forming a pattern of choice, suspending this combing operation as soon as the increase in the resin viscosity indicates that the gel stage is reached permitting the pattern to remain fixed into the resin.

The second example illustrated in FIG. 11 consists in pouring a predetermined quantity of liquid catalyzed resin 11 into the mold and by hand means introducing mother of pearl flakes in a desired pattern of choice before the increase in the resin viscosity indicates that the gel stage is reached and which proper timing can be controlled by means of accelerator-and-catalyst-to-resin ratios and operating temperature.

The third example is illustrated in FIG. 12 wherein by means of a fine pointed instrument that has previously been slightly impregnated or tipped with black polyester paste, black veins are formed in the liquid catalyzed resin mixed with a pearlessence pigment to simulate a marble surface.

Also, referring to FIG. 7, the second liquid mixture pour that remains or two thirds of the total to envelope the core can be mixed with bronzing powder introduced and combed or mottled after the liquid resin covers the top surface of the core. To produce a black marble effect, the fine pointed instrument is tipped with white polyester paste or any other light color of choice.

Using the described methods the article may have one or two decorative sides, but whenever a deeper three-dimensional decorative effect is desired additional steps may be followed.

(a) Forming the decorative effect by means of decorative layers in combination with one opaque layer that forms the background for the decorative effect and the masking medium for the core.

(b) Forming a transparent plastic layer to provide the finished surface of the article and additional decorative plastic layers in combination with the opaque layer that forms the background for the decorative effect and the masking medium for the core.

The general method of forming a first decorative layer 11, by any of the techniques described in FIGS. 10, 11 and 12, pouring an opaque plastic layer 12 and covering the core 10 with the last pigmented pour 13, is indicated in FIGS. 13 through 15.

The second general method of forming a first transparent plastic layer 14 poured into the mold, adding one layer with decorative effect 15, another opaque layer 16 and the last pigmented layer 17 enveloping the core 10 is illustrated in a cross-sectional view in FIG. 16, indicating the arrangement of said layers.

Following the described procedures the finished article when removed from the mold will have one finished surface and a secondary even and flat surface, its flatness depending on the viscosity of the resin or the amount of monomer or thinner used.

Sometimes in order to obtain a secondary smooth surface this may be achieved simply by adding a small amount of melted paraffin in styrene. This secondary surface may also be sanded, polished or buffed.

In order to produce an article with two perfect and desired finished surfaces, the additional steps to be followed are illustrated in FIGS. 17 through 23.

This is accomplished by means of fitting on top of the existing mold assembly after the clamps are removed, a top cover plate the underside of which conforms to the desired exterior surface finish of the article and a gasket to form a closed mold. This is depicted in FIG. 17 wherein the top cover plate 18 and the gaskets 19 are in position to be fitted on top of the existing mold assembly described in FIG. 3. In FIG. 18 the closed mold is already formed with the clamps 5 tightly securing the top cover plate 18 and the gaskets 19 against the mold walls 4 forming a cavity 23 limited by the top surface of the last cured plastic 21, the mold walls of the existing mold 4, the gaskets 19 and the underside of the top cover plate 18. The slot 20 has previously been machined in the mold walls 4 to provide means to introduce the liquid resin into said cavity and to permit the air to escape through said opening.

Then the entire mold assembly is tilted to an appropriate position so as to permit to introduce the liquid catalyzed resin 24 into the cavity 23 either from the top or from the bottom, as illustrated in FIGS. 19 through 22. In order to facilitate the entrapped air to escape from the cavity, the slot 20 must be properly shaped and located and also the mold assembly can be rotated.

After the cavity is filled and no air bubbles are present the mold may be stored for cure in any desired position, one example illustrated in FIG. 22, but preferably in a horizontal position depicted in FIG. 23 so as to guarantee that the liquid resin remains on the face of the top cover plate, plugging the slot by means of plug 26. This position permits better results, because the last plastic formed in opposite direction to the preceding layers when cured will provide isotropic properties, equal opposite stresses and an extremely hard plastic surface.

The article when removed from the mold will show two perfect finished surfaces, polished, satin, embossed, raised, sculptured, etched, irregular, etc.

In order to form decorative effects having three-dimensional characteristics visible through the secondary finished surface formed by means of the top cover plate, it is possible to pour additional layers on top of the last cured plastic that covers the core and form the decorative effect as indicated in FIGS. 10, 11 and 12, before fitting the top cover plate, illustrated in FIGS. 26 and 27.

FIG. 24 illustrates a cross-sectional view of an article with one finished surface and a secondary even surface comprising one decorative layer 30 that corresponds to the finished surface of the article, one opaque layer 29 forming the background for the decorative layer 30 and the masking medium for the core, the pigmented layer 28 that envelopes the core 10, and a decorative layer 27 that corresponds to the secondary even surface of the article, the background for this secondary decorative effect provided by the plastic that 28 envelopes the core.

FIG. 25 illustrates a cross-sectional view of an article with one finished surface and a secondary even surface comprising one decorative layer 34 that corresponds to the finished surface of the article, another decorative layer 33 to form with the preceding layer a deeper three-dimensional effect, one opaque layer 29 forming the background for the decorative layers 33 and 34 and the masking medium for the core, the pigmented layer 28 that envelopes the core 10, one decorative layer 31 formed on top of the layer 28 that covers the core and another decorative layer 32 that corresponds to the secondary even surface of the article formed on top of the preceding decorative layer 31, the background for the secondary decorative effect in layers 31 and 32 provided by the pigmented layer 28 that envelopes the core.

FIG. 26 illustrates a cross-sectional view of an article with two finished surfaces comprising a transparent layer 38 that corresponds to one of the finished surfaces of the article, one decorative layer 37 formed on top of this transparent layer, one opaque layer 29 forming the background for the decorative layer 37 and the masking medium for the core, the pigmented layer 28 that envelopes the core 10, one decorative layer 35 formed on top of the layer 28 that envelopes the core and a transparent layer 36 that corresponds to the second finished surface of the article formed into the closed mold on top of the decorative layer 35.

FIG. 27 illustrates a cross-sectional view of an article with two finished surfaces comprising a transparent layer 43 that corresponds to one of the finished surfaces of the article, one decorative layer 42 formed on top of the transparent layer 43, one opaque layer 29 formed on top of the decorative layer 42 forming the background for the decorative effect and the masking medium for the core, the pigmented layer 28 that envelopes the core 10, one decorative layer 39 formed on top of the pigmented layer 28 that envelopes the core, another decorative layer 40 formed on top of the preceding decorative layer 39 and a transparent layer 41 that corresponds to the second finished surface of the article formed into the closed mold on top of the decorative layer 40.

What is claimed is:

1. An ornamental panel comprising at least first and second layers of resinous material adhered together, a core means of foamed material having connections tying together said layers, said foamed material encased between said layers, at least one of said layers having particulate filler material intermixed therein, and a plurality of embedments substantially larger than said particulate material imbedded in an exterior surface of the layer having particles therein.

2. An ornamental panel of claim 1 which includes mineral as the particles.

3. An ornamental panel comprising first and second layers of resinous material adhered together, a core means of relatively rigid foamed material encased by said first and second layers, a foraminous reinforcement sheet overlying said second layer, a third layer of resinous material impregnating the foraminous sheet and bonded to said second layer, said third layer of resinous material having particles intermixed therein, and a plurality of chips substantially larger than the particles imbedded in the exterior surface of the third layer.

4. A unitary, seamless structural slab comprising at least one substantially rigid structural slab core media, said core media having nerve openings therethrough, sandwiched and tied within a mass of seamless self-bonded resinous media layers that is connected and interlocked with one another by said nerve openings, a masking media overlying the core and obscuring the nerve openings from view, the thickness of and volume occupied by said core being substantially greater than said combined resinous layers, the core being surrounded by the resinous mass and narrower than said structural slab, the article being a seamless, integrally interlocked, reinforced, stable, balanced, having layers and wherein the core media is not visible.

5. A surfacing material including the structural slab of claim 4 in which at least one of the self-bonded layers of plastic has visible decorative media.

6. The structural slab of claim 4, having isotropic properties and equal and opposite stresses from one side to the other.

7. The structural slab of claim 4 having a preformed film on a face thereof.

8. The structural slab of claim 4 which includes the core media being particle wood board.

9. The structural slab of claim 4 which includes the core media being at least one block of synthetic foamed material.

10. The structural slab of claim 4 wherein the masking media comprises particles.

11. The structural slab of claim 4 wherein the masking media is chips.

12. The structural slab of claim 4 which includes the plastic comprising particles.

13. The structural slab of claim 4 wherein the plastic comprises pigment additive.

14. The structural slab of claim 4 simulating marble.

References Cited

UNITED STATES PATENTS

| | | | |
|---|---|---|---|
| 2,159,300 | 5/1939 | Tashjian | 161—53 X |
| 2,376,653 | 5/1945 | Boyer | 161—39 |
| 2,632,722 | 3/1953 | Libberton | 161—115 X |
| 2,951,001 | 8/1960 | Rubenstein | 52—309 X |
| 3,078,510 | 2/1963 | Rowe | 161—162 X |
| 3,078,948 | 2/1963 | Gildard et al. | 161—69 X |
| 3,097,080 | 7/1963 | Weir | 117—9 |
| 3,216,167 | 11/1965 | Roberts | 161—43 X |
| 3,232,017 | 2/1966 | Prusinski et al. | 52—309 |
| 2,454,910 | 11/1948 | Carr | 18—59 |

FOREIGN PATENTS

| | | | |
|---|---|---|---|
| 754,299 | 8/1956 | Great Britain | 52—309 |

GEORGE F. LEMES, Primary Examiner

W. R. DIXON, Jr., Assistant Examiner

U.S. Cl. X.R.

161—115, 161, 162, 168, 43, 163, 159, 5, 39, 69; 156—293, 294; 52—302, 309, 315, 404, 445, 630; 264—247, 261, 271, 273